June 23, 1970   W. H. BENNETT   3,516,906
PRODUCTION OF NUCLEAR REACTIONS BY HIGHLY
CONCENTRATED ELECTRON BEAMS
Filed Nov. 28, 1966
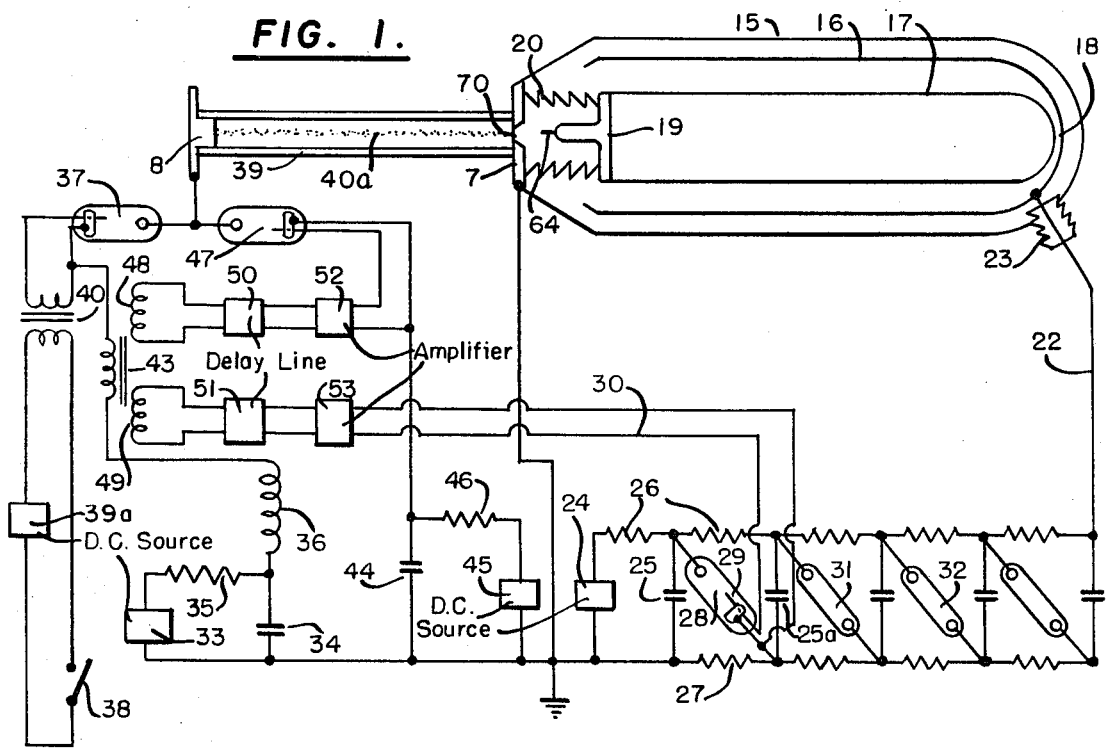
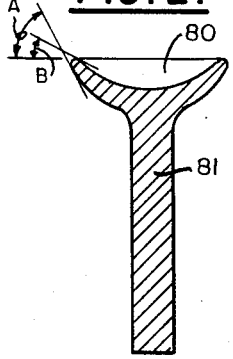
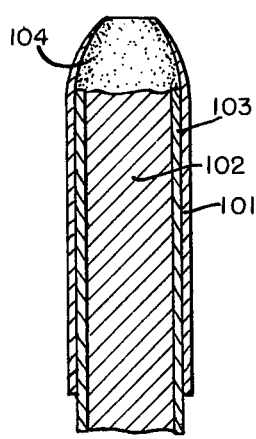
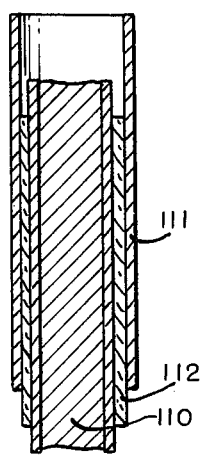
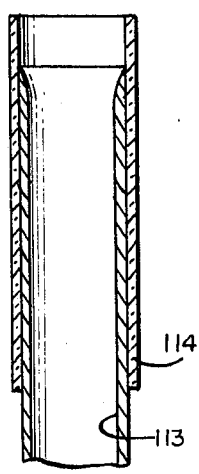
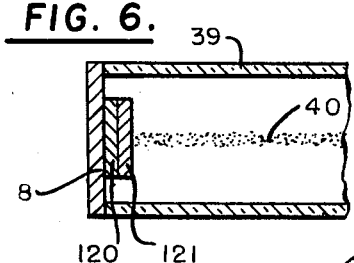
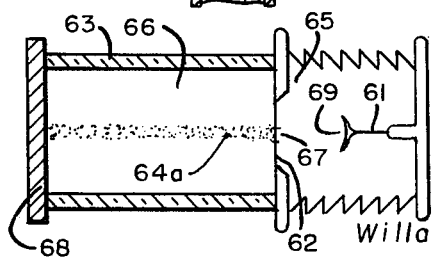
INVENTOR
Willard H. Bennett
BY Moore & Hall
ATTORNEYS United States Patent Office 3,516,906
Patented June 23, 1970

3,516,906
PRODUCTION OF NUCLEAR REACTIONS BY HIGHLY CONCENTRATED ELECTRON BEAMS
Willard H. Bennett, 5500 N. Hills Drive, Raleigh, N.C. 27609
Continuation-in-part of application Ser. No. 569,549, July 19, 1966. This application Nov. 28, 1966, Ser. No. 597,392
Int. Cl. G21b 1/00
U.S. Cl. 176—11                 4 Claims

ABSTRACT OF THE DISCLOSURE

The invention resides in a method of producing fragments of a nuclear reaction process in which a metal whose number on the Periodic Table of Elements is at least as high as 73, is bombarded with a beam of electrons, which has been concentrated by directing a beam of electrons into the self-magnetic field of a pinched discharge, and whose intensity is so great that it raises the temperature of the metal so rapidly and to such a high degree as to produce nuclear reaction products.

---

This application is a continuation-in-part of my prior copending application S.N. 569,549 filed July 19, 1966, entitled "Method of and Apparatus for Producing a Highly Concentrated Beam of Electrons."

Description of the invention

The present invention relates to a method of producing elements from other elements or compounds including the production of transuranic elements.

It has been proposed by others in the past that a subterranean nuclear explosion be used for producing high temperatures and pressures so that heavy nuclei would fuse and produce transuranic elements in quantity, and such an attempt has been made. Only very limited success has been attained, however, because the volumes involved are too great and the rise-times of the temperatures are too long to produce high enough temperatures for this purpose.

This invention relates to a far less expensive and much more effective method for producing heavy nuclear fusion in substantial quantities.

An object of this invention is to produce fragments of a fusion product, these fragments including the transuranic elements.

Another object of the invention is to provide a method of increasing the temperature of a mass very rapidly.

Another object of the invention is to very rapidly increase the temperature of a mass which is confined within another metallic mass so that the density and pressure under which the first mass is subjected is very great.

Still another object of this invention is to provide an electron beam which is more concentrated and powerful than any electron beam heretofore known and used.

Other objects and advantages of the invention will appear as this description proceeds.

In the aforesaid prior copending application, I illustrated a device for producing a highly concentrated thin beam of electrons which could be used to bombard a target. If the aforesaid beam is provided with sujcient energy and kept small enough it will upon striking the target, which may be, for example, a heavy metal, raise the temperature of such metal at a rate far faster than has heretofore been possible. If the rate of rise in temperature is great enough and the target is brought to a sufficiently high temperature, the frequency of collisions is increased, i.e., the rate at which target atoms collide forming a fusion product transiently. The probability of such a collision of atoms may be increased by placing the target metal in a jacket of lighter metal, for example, aluminum. Preferably the heavy metal should completely fill the jacket of the lighter metal and the lighter metal should be one through which the electron beam can readily penetrate so that the beam will dissipate its energy rapidly in the heavy metal, thus causing an extremely rapid rise in temperature of the latter. Since the heavy metal is confined within the jacket of the lighter metal, the pressure within the jacket increases very rapidly as the temperature rises, thus increasing the frequency at which atoms will collide to form the heavy fusion product mentioned above. This process will not initially destroy the jacket of lighter metal for that jacket will remain intact long enough to insure that the temperature and pressure is built up in the heavy metal to the desired values.

After the fusion products have been created, as described above, they will come apart in a great variety of fragments some of which are elements that are higher in the Periodic Table than uranium; indeed, by this process, elements as high as 110 or even higher on the Periodic Table may be produced. The heavy metal need not be uranium but it could be any other well known heavy metal such as tungsten, molybdenum, tantalum, columbium, lead or bismuth. It may be in any shape such as a plane, slab, sphere, or cube. It need not be a pure metal but it may be a compound or alloy involving a heavy metal in combination with some other element.

In the drawings:

FIG. 1 corresponds to FIG. 4 of my aforesaid prior copending application and illustrates apparatus which may be used in connection with this invention.

FIG. 2 is a sectional view of an improved form of cathode for use in place of cathode 64 of FIG. 1.

FIG. 3 illustrates a modified form of cathode for use in place of the cathode 64 of FIG. 1.

FIG. 4 is a further modified form of cathode for use in place of cathode 64 of FIG. 1.

FIG. 5 is a still further mdified form of cathode for use in place of the cathode 64 of FIG. 1.

FIG. 6 illustrates a mass and its surrounding jacket for use as aforesaid.

FIG. 7 is a still further form of cathode arrangement that may be employed.

FIG. 8 illustrates still another cathode. The tube 71 replaces cathode 64 of FIG. 1, and is similar to the other cathodes shown above except that the output end 72 is flared outward as shown.

Inside of a tank 15 there are suspended two coaxial cylindrical electrodes 16 and 17. The rounded caps on 16 and 17 are held much closer to each other at the gap 18 than the distance elsewhere between 16 and 17.

At the other end of the inner electrode 17 is a high voltage electrode 19 which is supported on an insulated bushing 20. All of the tank except the inside of the bushing 20 is filled with an insulator such as oil, or other insulating fluid or gas. The inside of the bushing is evacuated to pressures less than 1/10 micron by means of suitable vacuum pumps.

The intermediate electrode 16 is charged to a high voltage through a wire connected at 22 which extends through bushing 23 in the wall 15. This wire is connected to a source of high voltage shown in the lower part of FIG. 1 and may be constructed in any of many ways familiar to those skilled in the art.

In FIG. 1, a power supply 33, is used for charging a condenser 34, through a resistor 35. The condenser is connected through an inductance 36, and a transformer 43, to a triggered gap or thyratron or other high voltage valve 37. The device at 37 is triggered by closing the switch 38, which connects the high voltage from the power supply 39a, to the transformer 40. This applies a potential to the target 8 of the pinch tube 39 for the purpose described in the next paragraph.

The magnitude of the inductance 36 is selected to slow down the discharge in the pinch tube 39, enough to produce ionization throughout the tube but not to pinch down the discharge within less than about 10 to 100 microseconds if at all. This is called a pre-ionization and assists in readying the conditions inside of the pinch tube 39, so that when the condenser 44 is connected across the tube, a well-formed pinch will form promptly, i.e. within less than about 5 microseconds.

The power supply 45 charges the condenser 44 through the resistor 46. The condenser is connected to the triggered gap or other valve 47, to apply high voltage in a steeper pulse which causes the gas in 39 to ionize and pinch down to an ionized column 40a.

The transformer 43 has two secondary windings 48, and 49. The output from winding 48 is connected through a delay line 50 to the amplifier 52, which is connected to the triggering device 47. The other winding 49, is connected through a delay line 51, to an amplifier 53, which is connected to the triggering device 28, which fires the high energy machine.

The delay in either 50, or 51, is set so that the high energy electron pulse from cathode 64 is produced just before the pinch at 40a has drawn down to its minimum diameter of ionized column. For most dimensions of the parts of the machines and values of the electrical constants in the various parts of the complete equipment, the delay in the delay line 51 should be set at zero or this delay line should be removed and the delay in delay line 50 should be set at some value less than about 10 microseconds.

The direct current supply 24 of potential of the order of 50,000 or more volts charges a bank of condensers 25, 25A, etc., in parallel through high resistances 26 and 27 which are preferably more than 1,000 ohms each.

In the figure there are only four condensers, 25, 25A, etc., shown together with their associate spark gaps 29, 31, 32, etc., and resistors 26, 27, etc. In actual practice more condensers with associated components must be used, for most applications numbering between 20 and 200 such stages. In the following description it should be understood that a larger number of stages than shown in the figure are to be used.

Shown at 28 is a triggering device which is a spark gap in which the outer one of the electrodes has a hole in it along the axis of the two electrodes. Inside of the hole is held a wire, the end of which at 29 is near the opening towards the other electrode. This wire is insulated so that when a high voltage is suddenly applied to it through a wire 30, a small spark will jump from the end of 29 to the surrounding outer electrode. This causes a sparkover of the gap and suddenly connects the high voltage end of the first condenser 25 to the low voltage end of the second condenser 25A and applies a voltage across the next spark gap at 31 which is much greater than the breakdown voltage of that gap. This over-volts the next spark gap at 32 even more and so on, sparking over the next of the spark gaps and suddenly connects all of the condensers 25, 25A, etc. in series, applying the total voltage to the intermediate electrode 16. Instead of the triggered gap described above, a thyratron or any of the high voltage valves familiar in the art may be used.

When the electrode 16 attains a sufficiently high charge by reason of the condensers 25, 25A, etc., being connected thereto, the high voltage discharges across the gap 18 to the tube 17, thus resulting in a discharge from the high voltage electrode 19, establishing a concentrated beam of electrons which is projected along the axis of the tube 39, first passing through the diaphragm 70 which is sufficiently thin as to allow the electrons to pass therethrough but yet sufficiently thick to maintain the required vacuum.

Coordinated with this discharge, another discharge is caused to occur between the electrode 8 and the grounded electrode 7 through gas in the tube 39 which is held at a pressure of the order of 0.05 to 10 torr. This latter discharge which will be referred to as the pinch draws down to an ionized column 40a in the metal of tube 39. The values of components 33–39a, 33, 43–53 are so selected as to properly coordinate the two discharges. The coordination just referred to is mainly achieved by proper selection of delay lines 50 and 51 as explained above. Thus, the first thing to occur is the preliminary ionization in tube 39 due to triggering valve 37. The next events are the discharge and the final ionization in tube 39 due to triggering of valve 47 so that the pinch at 40a has drawn down to its optimum at the time of discharge from cathode 64.

As the high voltage electrons enter the pinch, they push outwards upon the more slowly moving electrons in the pinch, i.e., they push them radially outwards, thus leaving behind an excess of positive ions over pinch electrons, which excess tends to neutralize the space charge due to the high voltage electrons which are entering.

As the high voltage electrons enter the pinch, they also comprise an increasing electron current and this induces electric fields which tend to produce electron currents in the opposite direction in the vicinity of the high voltage beam. The component of velocity in the reverse direction given to the pinch electrons by the induced electric fields produces a force upon these pinch electrons which is radially outwards due to the interaction of that velocity component with the self-magnetic field of the injected high voltage electron beam. This radially outwards magnetic force is in addition to the outwards electric force due to excess negative charge, mentioned above. I have described this pinch effect in Physical Review, vol. 90, p. 398, 1953, in a paper entitled "Magnetically Self-Focusing Discharges."

The displacement of pinch electrons radially outwards allows the self-magnetic field of the high voltage beam to pinch that high voltage beam down further and to make this beam deliver energy upon the target electrode 8, a very much greater concentration of power than would have been possible with the divergent beam that would have occurred, if the pinch had not been used.

The self-magnetic field of the pinch also acts as a guide to deliver the concentrated high voltage beam to the target at the middle of the end of the pinch which is at the target electrode 8.

In the production of very intense pulsed beams of electrons at relativistic energies it is generally found that the electrons spread out violently from the field emitting cathode. It would be much better for many applications if the electrons could be made to emerge along a smaller diameter beam and in a better collimated form. There are several ways in which to accomplish this by redesigning the form of the cathode as follows.

One form of cathode is shown in FIG. 2. This cathode has a concave face 80 supported on a shaft 81. As shown, the angle A should preferably be between 15° and 90° and angle B, which of course, is less than A, should be between 0° and 75°.

Another form is shown in FIG. 3 in which a hollow tube 101 contains an oxide 104 or other material which improves the electron emissivity on the inside of the end of the hollow tubular cathode 101. One source of such material would be a small diameter getter type tube 103 (containing getter material 102) whose end is open and consequently oxidized. Another arrangement would be to directly apply the emissive material on the inside of the hollow tubular cathode 101.

Another form is illustrated in FIG. 4 in which a metal wire or getter type tube 110 is directly connected to the high voltage source and surrounding it is a hollow tubular cathode 111 which is held insulated from the center conductor by glass tubing 112 or other insulator. The outer tube 111 protrudes beyond the end of the center conductor 110 so that when the high voltage is applied across the gap in the machine there is an arc-over from the center conductor to the surrounding tube which produces an electron emitting condition on the inside of the end of the protruding tube.

Still another form as illustrated in FIG. 5 in which a hollow tubular cathode 163 is surrounded only by a piece of glass 114 tubing or other insulator.

It is understood that in the case of each of FIGS. 2 to 5, inclusive, that the cathode shown is to replace the cathode 64 of FIG. 1, and the discharge end (in each case the upper end as the cathodes appear in the drawings) is pointing toward target 8.

The particular sizes, shapes, and forms of these and similar arrangements will vary in accordance with the materials used and also with the gap length in the high voltage machine but the desirable feature is the production of the electron emissive conditions at positions in or on the cathode so that the emission is caused to move in a comparatively well collimated beam rather than diverging violently in all directions from the end of the cathode.

FIG. 6 pertains to still another form of high voltage discharge system. In FIG. 7 is shown a cathode 61 facing an anode 62 which consists of a thin sheet of metal. Beyond this sheet of metal is a glass tube 63 within which a linear pinch discharge is produced along the channel 64a. In the previous disclosures a thin sheet 7 separated the high vacuum high voltage region (inside 20) from the pinch discharge region 40a in which the gas pressure is in the order of 10 to 100 microns.

In FIG. 7 the thin sheet 62 has a very small aperture in it at the position 67 so that when the pinch discharge is formed in the tube 63 by applying a voltage between 62 and the pinch anode 68 there are some positive ions which pass through the aperture and move toward the cathode 61. The cathode 61 is made with a slightly concave face whose curvature centers on the aperture approximately.

In FIG. 7 the positive ions are moving at low density from 67 towards 69 at the time that the cathode 69 has applied to it a negative potential of more than one million volts relative to the anode 62. This causes the positive ions to accelerate rapidly towards the cathode face at 69 producing very high voltage cathode rays from the face which are aimed towards the middle of the ionized channel 64a.

The presence of positive ions between 69 and 67 has the additional advantage of providing a positive space charge which neutralizes the space charge of the very great currents of electrons emerging from 69.

The cathode 69 does not have to be in the form of a concave face but can have the form of a wire end, or a dull cylinder end or a small sphere or any other shape in order to attain the advantage of space charge neutralization or production of steady cathode ray emission. A prefered form is as shown in the figure.

In FIG. 7 the distance between cathode 69 and an anode 67 should be greater than that at which field currents from 69 would be produced at high currents in the absence of the positive ions coming through the aperture at 67, in order that the emission from 69 will be cathode ray emission rather than high vacuum field emission. In this case if the linear pinch discharge fails to fire in the tube 63, no damage is done in the X-ray tube (the tube containing cathode 69 and anode 62). It simply fails to fire and in fact the distance can be adjusted so that the current across the gap from 69 to 62 will be precisely that current which is produced under the influence of the approaching positive ions.

In order to practice one form of the invention hereinafter claimed, a heavy metal, such as one of those hereinabove mentioned, is located at 120 covered by a plate 121 of a light metal, the plate being mounted on the electrode 8. The apparatus is constructed and arranged to produce an electron beam 40a having a relativistic energy on the order of at least ½ million electron volts and preferably of the order of 10 million electron volts and with the beam 40a confined to the smallest practicable cross section. As a result the beam readily penetrates the light metal 121 and dissipates energy very rapidly in the heavy metal 120, increasing the temperature of the latter at an extremely rapid rate. The rate of increase in temperature is greater than in connection with a subterranean nuclear explosion, and since the heavy metal 120 is confined by the lighter metal 121, at least for a limited period of time, the pressure developed is very great, thereby causing three or more atoms of the metal 120 to collide, forming a fusion product of three or more times the atomic mass of one atom.

In this process nuclei of substantial quantities of heavy elements are fused, or if the mass 120 includes more than one element, the fusion of the heavy metal is with a selected amount of lighter metal of a chosen kind. The re-fission is an entirely different distribution from that in the initial material. This results in substantial yields of fragments of fuson products which are produced in only negligible quantity, if at all, by other methods.

The temperature of heavy metal 120 may be increased to an ultimate value of the order of 1,000,000,000 degrees or higher in a period of time of 0.1 microsecond.

The pinched radius of the beam 40a should preferably be of the order of 0.1 millimeter or less, and the intensity of the beam should be $10^{13}$ watts for $10^{-7}$ seconds delivering energy of the order of $10^6$ joules.

The heavy metal 120 may itself be the end plate 8. Alternatively, the heavy metal 120 may be enclosed with a cover of the lighter metal 121.

I claim to have invented:

1. The method of producing fragments of a nuclear reaction process which includes bombarding a metal mass whose number on the Periodic Table of Elements is at least as high as 73 with a beam of electrons which has been highly concentrated by passing the same into the self-magnetic field of a pinched discharge and is so intense that the mass is raised in temperature so rapidly and to such a high degree as to produce nuclear reaction products.

2. The method of producing fragments of a nuclear reaction process as stated in claim 1 in which said beam is focused on said metal.

3. The method of producing fragments of a nuclear reaction process as stated in claim 1 in which said metal constitutes an anode for attracting said beam of electrons.

4. The method of producing fragments of a nuclear reaction process as stated in claim 2 in which said beam is focused on said metal.

References Cited

UNITED STATES PATENTS

| 917,191 | 4/1909 | Trivelli | 176—11 |
|---------|--------|----------|--------|
| 2,161,985 | 6/1939 | Szilard | 176—11 |
| 2,907,704 | 10/1959 | Trump | 250—49.5 X |
| 2,931,939 | 4/1960 | Christofilos et al. | 250—49.5 |
| Re. 26,801 | 9/1966 | Dyke et al. | 250—49.5 |

OTHER REFERENCES

M. S. Livingston et al.: Particle Accelerators, 1962, p. 229.

REUBEN EPSTEIN, Primary Examiner

U.S. Cl. X.R.

176—1; 250—49.5